Patented Sept. 11, 1934

1,973,398

UNITED STATES PATENT OFFICE 1,973,398

PROTECTING RUBBER

Elmer W. Trolander and William Courtney Wilson, Chicago, Ill., assignors to Pyroxylin Products, Inc., Chicago, Ill., a corporation of Illinois No Drawing. Application May 2, 1931, Serial No. 534,611

12 Claims. (Cl. 91—68)

The present invention relates to a protective coating for rubber having cellulose esters as essential components and in particular to such coatings that are flexible and tightly adherent to rubber. It relates also to rubber articles provided with a tightly adherent protective or decorative coating.

There has long existed a demand for a protective and/or decorative coating for flexible rubber articles which would flex and bend with the rubber and which would adhere tightly thereto. This demand has been met in part by protective coatings composed essentially of drying oils, or drying oil varnishes. Such coatings have a fair degree of adherence and flexibility, and are used to a considerable extent for coating colored hollow rubber balls, and other such coated rubber articles as are found on the market at the present time. These oil base coatings dry and solidify for the most part by oxidation and polymerization of the oil, which oxidation and solidification continue so that the coating after a relatively short time loses its elasticity and cracks under flexing. Furthermore, most of these coatings require baking, which is in itself objectionable, and when the rubber is heated in contact with the oil, the rubber is more or less injured. Flexible oil base films when new have the further disadvantage of being relatively soft, and readily pick up dirt which easily becomes embedded in the coating and cannot be removed. A still further disadvantage is the ease with which an oil base coating is attacked by hydrocarbons, mineral oils, and greases, such as lubricants, so that such coatings afford little, if any protection against the harmful action of such materials on rubber. It might further be mentioned that the aging of rubber is due for the most part to oxidation. Since most of these oil base coatings contain "driers", they afford practically no protection whatever to the rubber against oxidation. Driers are catalysers to promote oxidation.

Ordinary cellulose ester lacquers are unsatisfactory as rubber coatings because of their lack of adherence, and/or their lack of flexibility. So far as we are aware nitrocellulose ester finishes heretofore, have not been successfully used on flexible rubber surfaces. Cellulose esters, such as the nitrate and acetate are not of themselves suitable for coating rubber. They are not flexible and have little or no adherence to rubber.

The present invention aims to provide a protective coating for rubber having a cellulose ester base suitably deposited to form a film or coating that undergoes substantially no further chemical changes, such as oxidation.

Another and an important object is to provide a coating that is highly adherent to rubber, so that even under great flexing it remains tightly adherent to the rubber.

Another object of our invention is to provide a coating that is highly flexible, so that the coating may be flexed with the rubber without breaking or losing its adherence.

A still further object of our invention is to provide a strong and tough coating that is highly resistant to abrasion.

A further object is to provide a film which has a dry non-tacky surface, such that dirt does not easily become embedded therein, nor adhere thereto and which may be easily cleaned, as for example, with soap and water without injury to the coating.

A still further object is to provide a coating that is not appreciably affected by mineral oils and greases, thus providing an almost complete protection of the rubber against the action of gasoline, lubricating oils, etc.

Another object is to provide a coating that is not appreciably affected by ozone or oxygen, and which will prevent to a high degree, oxygen and ozone from coming in contact with the rubber and causing its disintegration or "aging".

Another object is the provision of such a coating which has a pleasing appearance, and which is therefore adapted for uses where a decorative effect is desired.

Other and ancillary objects and advantages of the present invention will become apparent from the following description and explanation of the invention and from the examples hereinafter given, to enable those skilled in the art to understand and to practice the invention which is defined in the appended claims.

We have discovered that we can secure a coating for rubber having the above desirable properties by the proper use of cellulose esters in conjunction with special modifying agents. Our preferred coating is produced by the use of two or more separately deposited films of different compositions. These films may be deposited from a liquid composition, as will be explained hereinafter, in which a solvent is used that is capable of softening or redissolving the coat or coats already applied. During the drying stages, therefore, there is ordinarily a certain amount of diffusion of the volatile and the non-volatile material from one coat to another, so that in the finished coating there is not always a sharp line of demarcation between the layers of different compositions. The diffusion of non-volatile material effects a permanent migration of film-forming matter from one film into another which is highly advantageous.

Great adherence to rubber and a degree of flexibility equal to many usual rubber compositions may be secured by the use of our special bonding or priming coat. Since there is a considerable latitude both in the choice of materials used and in the proportions used, we will describe in general terms the method of securing flexibility and adherence to rubber in our compositions and then illustrate by means of specific examples.

For the bonding coat, for direct application on the rubber or rubber composition, we prefer to use a material that is relatively low in content of cellulose esters and relatively high in content of plasticizer as compared, say, to the usual types of cellulose ester compositions such as lacquers. In some cases, we may dispense entirely with the cellulose ester. The cellulose ester content of this bonding coat may be formed initially or be increased later by diffusion of cellulose ester from subsequent coats into the bonding coat. We have found in general that materials which act as plasticizers for and are compatible with cellulose esters are best suited as raw materials for the rubber bonding coat. Thus, for example, as the non-volatile constituents of the bonding coat, we may use various proportions of solvent and non-solvent plasticizers, or of solvent or semi-solvent plasticizers, preferably with a relatively low proportion of the cellulose ester. A solvent plasticizer is a substantially non-volatile ingredient which functions as a softener or plasticizer and which has the power of dissolving the cellulose ester with which it is used.

In general, we have found that a good bonding coat should contain less than 35% of cellulose ester. Where the rubber composition contains a relatively high proportion of rubber, good results are obtained where as little as 5% or even less of cellulose nitrate or acetate is used in the non-volatile composition of the bonding coat.

The bonding coat may be of such a nature as to be quite tacky or sticky after the solvent has evaporated. For example, where the cellulose ester plasticizer is of such a nature as to be capable of holding the cellulose ester in solution as where there is present a sufficient amount of solvent plasticizer, the composition will be relatively soft or even tacky. A certain amount of tackiness seems to be desirable, and for this reason we prefer to use relatively large proportions of materials that may be classed as "solvent plasticizers". The esters of phthalic acid, dibutyl tartrate, tricresyl phosphate, etc., are suitable solvent plasticizers for nitrocellulose. The toluene sulfonamids are suitable solvent plasticizers for cellulose acetate. Castor oil and rape seed oil illustrate non-solvent plasticizers, but the materials properly included in these classes of plasticizers are well known and need not be included here.

Since, as has been shown above a certain amount of tackiness is desirable in the bonding coat, we prefer to use sufficient solvent plasticizer to render the resulting bonding coat tacky after the evaporation of the solvent. We may, for example, use a cellulose ester and a non-solvent plasticizer and then add sufficient solvent plasticizer to render the product tacky, or we may use only cellulose ester and a sufficient amount of solvent plasticizer to form a mixture that is tacky when free from volatile solvent.

One type of plasticizer which we have found especially satisfactory consists of certain soft or balsam-like resinous materials which are compatible with the particular cellulose ester that is being used. Such resins may be considered as plasticizers for the cellulose esters since they impart softness and/or flexibility when used in combination with the cellulose esters. Where such resinous products are used, a less amount of solvent plasticizer may be used, since the resinous material itself may be tacky in nature or in the composition may contribute to the tackiness. Where such resins are used, a relatively low proportion or an absence of cellulose ester may be advantageous in the coating composition, especially for the purer forms of rubber, since in general, adherence decreases with an increase of the cellulose ester content.

The bonding coat may be applied by any convenient method, but we prefer to dissolve the non-volatile constituents in volatile solvent, and apply the solution to the surface of the rubber. The solvent should be of such composition as to hold all of the non-volatile constituents in solution until all of the solvent has evaporated. When applied for adherence to rubber it should preferably contain a sufficient amount of rubber solvents or softeners to have some solvent or penetrating action on the rubber. For this purpose the hydrocarbons, such as toluene, benzene, hexalin, naphtha, and the like are useful. By providing a solvent that has some solvent or penetrating action on the rubber, the surface of the rubber is somewhat softened and it is probable that there is a certain amount of diffusion between the bonding coat and the rubber itself. In order to encourage this diffusion it is preferable to use a solution of relatively low viscosity. A solution having a viscosity of 10 to 150 centipoises is satisfactory, although solutions having much higher or lower viscosities may be used under some conditions. The low viscosity may be obtained, and the viscosity regulated, by increasing the ratio of solvent to non-volatile constituents, and/or by the choice of a low viscosity cellulose ester.

In general it is more difficult to secure good adherence between a cellulose ester coating and the surface of a rubber composition containing a high percentage of rubber than with compositions containing relatively large percentages of filler, as for example, zinc oxide, clay and the like. Thus, on pure rubber we prefer to use a bonding coat that is very low in cellulose esters, or that may of itself contain no cellulose ester. Thus the rubber may be given a bonding coat of a solvent plasticizer for cellulose ester, or a mixture of solvent and non-solvent plasticizers for cellulose ester. We may also, of course, use a relatively small amount of cellulose ester in a bonding coat on pure rubber. In general, we prefer that the non-volatile constituents of a bonding coat to be used on rubber compounds that are highly flexible and have a relatively high percentage of rubber, should contain only from zero to 15% or 20% cellulose ester, if a high degree of adherence is to be secured. We have been able to secure a high degree of adherence and flexibility by the use of a sufficient proportion of solvent plasticizer in the bonding coat to render it capable of dissolving, or holding in solution the cellulose ester that is applied directly on the bonding coat. In some cases, it is preferable that the bonding coat be capable of penetrating or softening, at least to a slight degree, the surface of the rubber.

On rubber articles that are less flexible and contain relatively large proportions of filling materials, as for example, zinc oxide, clay, etc., larger proportions of cellulose ester may be used.

To illustrate our invention as it relates to the bonding composition we give the following examples, without, however, limiting this phase of our invention to or by these illustrative examples, which are merely exemplary of the principles involved.

*Example 1.—Bonding composition*

| | |
|---|---|
| Regular soluble cellulose nitrate | 15 |
| Modified resin of phthalic acid-glycerol having plasticity designated | 21.6 |
| Castor oil | 9 |
| Dibutyl phthalate | 8 |
| Toluene | 135 |
| Butanol | 35 |
| Ethyl alcohol | 55 |
| Butyl acetate | 55 |
| Ethyl acetate | 65 |

*Example 2.—Bonding composition*

| | |
|---|---|
| Regular soluble cellulose nitrate | 35 |
| Low melting resin | 90 |
| Castor oil | 44 |
| Diamyl phthalate | 30 |
| Toluene | 540 |
| Denatured alcohol | 250 |
| Butanol | 70 |
| Butyl acetate | 220 |
| Ethyl acetate | 300 |

*Example 3.—Bonding composition*

| | |
|---|---|
| Dibutyl phthalate | 15 |
| Soft polymerized resinous body that acts as a plasticizer for nitrocellulose | 45 |
| Toluol | 540 |

*Example 4.—Bonding composition*

| | |
|---|---|
| Toluene sulfonamid formaldehyde resin | 10 |
| Toluene sulfonamid | 40 |
| Cellulose acetate | 10 |
| Toluene | 90 |
| Mono methyl ether of ethylene glycol | 90 |
| Acetone | 360 |

*Example 5.—Bonding composition*

| | |
|---|---|
| Toluene sulfonamid resin | 10 |
| Toluene sulfonamid | 40 |
| Acetone | 170 |
| Toluene | 280 |

*Example 6.—Bonding composition*

| | |
|---|---|
| Toluene sulfonamid | 40 |
| Acetone | 150 |
| Toluene | 210 |

*Example 7.—Bonding composition*

| | |
|---|---|
| Triacetin | 40 |
| Acetone | 150 |
| Toluene | 210 |

*Example 8.—Bonding composition*

| | |
|---|---|
| Diethoxyethyl phthalate | 24 |
| Blown castor oil | 16 |
| Toluol | 360 |

In the above formulas the solvent plasticizers are dibutyl phthalate, diamyl phthalate, toluene sulfonamid, triacetin, and diethoxyethyl phthalate.

Bonding compositions may be applied in one or more coats, of similar or different composition, as may be desired. When a proper bonding coating is dried by evaporation of its solvents, a very flexible adherent coating remains on the rubber. This is useful as an anchor for succeeding application of a cellulose ester composition, which need not be compounded for adherence to rubber like the initial bonding coat. We prefer to develop mechanical strength and a strong tough surface in the composition which is used for an intermediate or an outside coat. These coatings include as their important functional constituent, a cellulose ester base and a plasticizer. We may also, of course employ modifying agents such as pigments, dyes, non-plasticizing resins, etc., depending upon the final result that is to be obtained.

The proportion of cellulose ester in the coats applied over the bonding coat is preferably higher than in the bonding coat itself. These coats may be designed to meet specific conditions. For example, for rigid surfaces, the surface coating advantageously may contain up to 60% or even more cellulose ester, the remainder being plasticizing agents, resins, pigments and the like. For surfaces that are to be deformed or flexed, a greater proportion of plasticizer is required, and the amount of non-plasticizer resin, as for example, damar, ester gum, glycerol-phthalic acid, is correspondingly reduced. Where resistance to oxidation and especially where ozone is likely to be present, as for example, in the case of electrical insulation, we prefer to use a composition containing as much cellulose ester as possible, together with sufficient amount of plasticizer to give the required flexibility and/or distensibility. In other words where protection against ozone and oxygen is especially important the use of hard resins, drying oils and the like should be avoided.

The following examples illustrate suitable compositions for use over the bonding coat. Colors or pigments may be added or left out as desired.

*Example 9.—Cellulose nitrate, high flexibility*

| | |
|---|---|
| Cellulose nitrate | 43 |
| Tricresyl phosphate | 23 |
| Castor oil | 2 |
| Synthetic balsam compatible with nitrocellulose | 55 |
| Ethyl alcohol | 110 |
| Naphtha | 46 |
| Ethyl acetate | 85 |
| Toluene | 36 |
| Carbon black | 12 |

*Example 10.—Cellulose nitrate, high flexibility*

| | |
|---|---|
| Cellulose nitrate | 40 |
| Castor oil | 68 |
| Dibutylphthalate or diamyl phthalate | 12 |
| Ethyl alcohol | 40 |
| Ethyl acetate | 90 |
| Toluene | 90 |
| Butyl acetate | 55 |

*Example 11.—Cellulose nitrate, medium flexibility*

| | |
|---|---|
| Cellulose nitrate | 45 |
| Castor oil | 20 |
| Synthetic balsam compatible with nitrocellulose | 18 |
| Dibutylphthalate or diamyl phthalate | 13 |
| Ethyl alcohol | 60 |
| Naphtha | 20 |
| Ethyl acetate | 100 |
| Toluene | 80 |
| Butyl acetate | 40 |
| Toluidine red pigment | 9 |

*Example 12.—Cellulose nitrate, low flexibility*

| | |
|---|---|
| Cellulose nitrate | 50 |
| Tricresyl phosphate | 10 |
| Castor oil | 16 |
| Dibutylphthalate or diamylphthalate | 10 |
| Resin (such as ester gum) | 4 |
| Ethyl alcohol | 40 |
| Xylol | 160 |
| Butylpropionate | 110 |

Example 13.—Cellulose acetate

| | |
|---|---|
| Cellulose acetate | 40 |
| Toluene sulfonamid | 40 |
| Tricresyl phosphate | 10 |
| Acetone | 40 |
| Mono ethyl ether of ethyl glycol | 50 |
| Denatured alcohol | 15 |
| Toluene | 20 |

Example 14.—Cellulose acetate

| | |
|---|---|
| Cellulose acetate | 44 |
| Toluene sulfonamid formaldehyde resin | 10 |
| Toluene solfonamid | 35 |
| Acetone | 100 |
| Mono methyl ether of ethyl glycol | 75 |
| Denatured alcohol | 50 |
| Toluene | 50 |
| Ethyl lactate | 75 |

We have disclosed the use of a coating composition high in plasticizer and low or lacking in cellulose ester directly in contact with the rubber and the use of a coating relatively high in cellulose ester in contact with the air, but where the rubber composition contains relatively little rubber the necessity for the special bonding coat becomes proportionately less.

It will of course be understood that wide variations of our process are possible without departure from the spirit of our invention. For example, a bonding coat having the described characteristics may be used, and one or more intermediate coats applied over the bonding coat differing from each other and from the final coating may be used as will be readily understood. Also, we may employ cellulose nitrate in the bonding coat and cellulose acetate in the finishing coat or vice versa. Other variations such as the use of small amounts of rubber or rubber-like products in the bonding coat or in subsequent coats, and a wide range of solvents, may be employed as is well known in the art.

According to one aspect of the invention it comprises a formation of an integral film having properties adapting it to use on rubber and rubber compositions, and having different properties on the two sides. On the exterior it has wearing and resistant qualities as described. On the interior applied side it has adherent qualities and is not sharply defined as an adherent film surface, but is more or less merged, through an intermediate composition, with the article carrying it. This characteristic of the interior is dependent upon the original composition and the method of application.

The film is preferably made in two or more layers integrally united. The interior layer is compounded for adherence and for anchoring a subsequent layer, which is adapted to be so anchored. When the anchored layer is the outside layer, it is, or otherwise the outside layer is, specially adapted to present the desired body and surface qualities.

We claim:

1. A surface protected rubber-base composition comprising a rubber-base composition, an adherent surface layer of non-volatile plasticizer thereon capable of dissolving a cellulose ester, and on said layer a second layer containing said cellulose ester, said second layer having the inner adjacent face anchored to said first layer by solution therein.

2. The method of securing a cellulose-ester-containing coating to the surface of rubber and rubber compositions which comprises coating said surface with a material capable of acting as a solvent plasticizer for the adjacent surface layer of a subsequent nitrocellulose coating, and then applying a nitrocellulose base coating solution.

3. The method of securing a cellulose-ester-containing coating to the surface of rubber and rubber compositions which comprises coating said surface with a material capable of acting as a solvent plasticizer for the adjacent surface layer of a subsequent cellulose-ester-containing coating, and then applying a coating solution containing cellulose ester.

4. A formed rubber composition having rubber surface thereof coated with a relatively soft adherent bonding coat containing a solvent type of cellulose ester plasticizer, and on said bonding coat an adherent layer of a composition containing cellulose ester.

5. A rubber base article having a protecting coating over the rubber base comprising a rubber base composition, a priming coat on said composition comprising a substantially non-volatile soft sticky coating including a cellulose ester solvent plasticizer, and on said priming coating a superimposed coating of a flexible non-sticky composition having a cellulose ester base.

6. The method of coating a rubber base article with a cellulose ester comprising coating on the surface of said article a tacky composition containing essentially cellulose ester solvent plasticizer, and thereafter coating on said tacky coat a solution containing cellulose ester base and a volatile solvent, and evaporating the solvent.

7. The method of coating a rubber base article with a cellulose ester comprising coating on the surface of said article a solution containing non-volatile matter having over 50% of solvent plasticizer for cellulose ester and a volatile solvent capable of penetrating the rubber, evaporating volatile solvent to form a residue as a tacky coat on the surface of the article, thereafter coating on said tacky coat a solution containing cellulose ester base and a volatile solvent, and evaporating the solvent.

8. The method of coating a rubber base article with a cellulose ester comprising coating on the surface of said article a tacky composition comprising essentially solvent plasticizer for cellulose ester and resin which is soft at 70° F., thereafter coating on said tacky coat a solution containing cellulose ester base and a volatile solvent, and evaporating the solvent.

9. The method of coating a rubber base article with a cellulose ester comprising coating on the surface of said article a tacky composition comprising essentially cellulose ester, solvent plasticizer therefor, and resin which is soft at 70° F., thereafter coating on said tacky coat a solution containing cellulose ester base and a volatile solvent, and evaporating the solvent.

10. The method of coating a rubber base article with a cellulose ester comprising coating on the surface of said article a tacky composition comprising essentially cellulose ester and solvent plasticizer therefor, said cellulose ester being present to the extent of from 0% to 35% in said composition, and thereafter coating onto said tacky coat a solution containing cellulose ester base, plasticizer, and volatile solvent, the second coating composition having in the non-volatile ingredients a higher percentage of cellulose ester, and a lower percentage of plasticizer than the non-volatile solids of the first coat.

11. The method of coating a rubber base article with a cellulose ester comprising coating on the surface of said article a tacky composition comprising essentially cellulose ester and solvent plasticizer therefor, said cellulose ester being present to the extent of from 0% to 35% in said composition, and thereafter coating onto said tacky coat a solution containing cellulose ester base, plasticizer, and volatile solvent, the second coating composition having in the non-volatile ingredients at least 35% cellulose ester.

12. The method of coating a rubber base article with a cellulose ester comprising coating on the surface of said article a tacky composition comprising essentially solvent plasticizer for cellulose ester, and thereafter coating onto said coating a cellulose ester base solution which is of itself capable of drying to form a hard exposed surface, the second coating in the drying thereof being capable of merging by diffusion and solvent action in a limited zone with the tacky first coat, whereby the hard surface substance is anchored to the rubber through a changing composition varying inwardly from hardness to tackiness.

ELMER W. TROLANDER.
WILLIAM COURTNEY WILSON.